March 26, 1929.  H. C. LORD  1,707,214

JOINT

Filed Sept. 1, 1925

INVENTOR.
Hugh C. Lord

Patented Mar. 26, 1929.

1,707,214

UNITED STATES PATENT OFFICE.

HUGH C. LORD, OF ERIE, PENNSYLVANIA.

JOINT.

Application filed September 1, 1925. Serial No. 53,927.

The joint is intended to insulate different parts of structures subjected to jar, such as the body and chassis of an automobile and as exemplified is secured between the body and chassis of an automobile. Features and details of the invention will appear from the specification and claims.

The invention is illustrated in the accompanying drawings as follows:—

Figure 1:
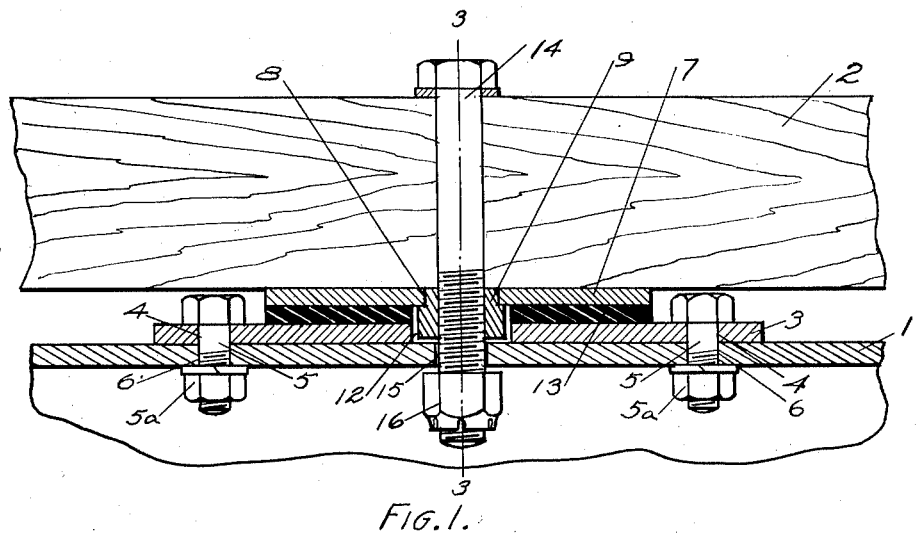

Fig. 1 shows a central longitudinal section through the joint.

Figure 2:
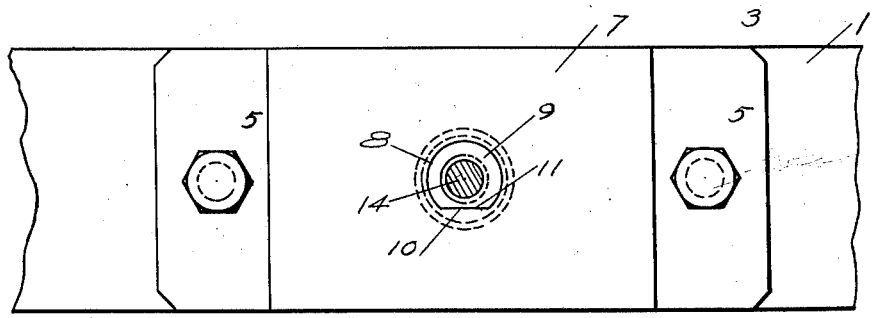

Fig. 2 a plan view of the joint.

Figure 3:
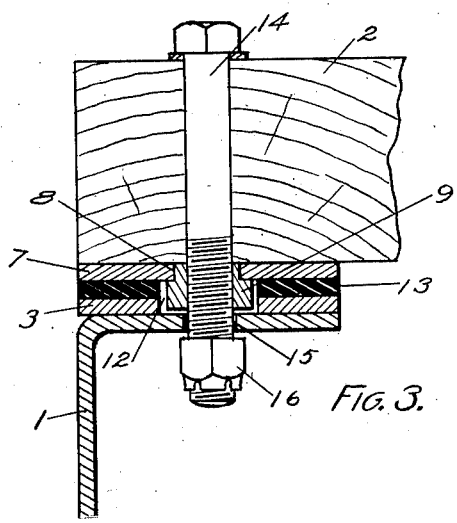

Fig. 3 a section on the line 3—3 in Fig. 1.

1 marks the channel of the automobile frame, and 2 the sill of the body. These may be of any desired construction. A plate 3 has perforations 4 near its ends and bolts 5 extend through the perforations 4 and perforations 6 in the channel and are secured by nuts 5ª on to the channel. An upper plate 7 is shorter than the lower plate so as to give clearance for the bolts 5 and permit these bolts to be readily put in place. The plate has a central perforation 8 and a nut 9 is arranged between the plates, the nut having a projection extending into the perforation 8. The perforation is out of round, or has a straight portion 10 which is engaged by a similar surface or straight portion 11 on the nut so as to lock the nut against turning. Ordinarily the nut is placed in the perforation with a pressed fit but this is not essential as when the parts are in place the nut is locked in place by the channel. The plate 3 has an opening 12 opposite the opening 8 and somewhat larger than the opening 8 so as to permit the insertion of the nut.

A rubber insert 13 is arranged between the plates 3 and 7 and bonded to the opposing surfaces of the plates so as to tie them together. This bonding is accomplished in any of the well known ways but preferably as the rubber is vulcanized. A bolt 14 extends through the sill 2 and is screwed through the nut 9. An opening 15 is arranged in the channel in line with the opening in the nut, the opening 15 being somewhat larger than the bolt so as to permit some movement of the bolt rubber without metal engagement of the bolt with the channel. The opening 15 may simply provide means for added over length, the end of the bolt extending through the nut but preferably the bolt extends through the opening 15 a sufficient distance to receive a nut 16 on the underside of the channel, the nut being, however, out of contact with the channel.

The nut preferably extends into the plate 3 so as to give the nut sufficient thread length and in many cases it is desirable to make the thickness of the rubber and plates somewhat smaller than that shown and here the added length of nut is of importance. The nut, however, is out of engagement with the walls of the opening 12 and in the construction shown the rubber can be vulcanized in place leaving the openings 8 and the opening in the rubber corresponding thereto and the nut placed in position after the vulcanizing operation.

With this construction it will be seen the sill is entirely insulated from the frame and the rubber permits a slight yielding to prevent distortion of parts. By extending the bolt through the sill and channel these parts are positively locked together should there be any failure of the rubber.

It will be noted that the nut and extension of the bolt limit the side slip of the plates relatively to each other and this may be made as great, or as small as desired.

What I claim as new is:—

1. In a joint, the combination of two opposing joint plates; a rubber insert between the plates bonded to the opposing plates; and securing means on each of the plates, the securing means on one plate being off-set as to the securing means on the other plate, the securing means on one plate extending between the plates and the rubber.

2. In a joint, the combination of two overlapping joint plates; a rubber insert between the plates bonded to the opposing plates; and a securing means secured to one of the plates and extending into lapping and non-contacting relation to the other plate and between the rubber.

3. In a joint, the combination of two opposing joint plates having oppositely placed openings, the opening in one plate being larger than the other; a rubber insert between the plates bonded to the opposing plates; and securing means inserted through the larger opening and into engagement with the walls of the smaller opening.

4. In a joint, the combination of two opposing joint plates having oppositely placed openings, the opening in one plate being larger than the other; a rubber insert between the plates bonded to the opposing plates; and a nut inserted through the larger opening into engagement with the walls of the smaller opening.

5. In a joint, the combination of two opposing joint plates having oppositely placed openings, the opening in one plate being larger than the other; a rubber insert between the plates bonded to the opposing plates; and a nut inserted through the larger opening into engagement with the walls of the smaller opening, said nut extending into but out of contact with the walls of the larger opening.

6. In a joint, the combination of opposing joint plates; a rubber insert between the plates bonded to the opposing plates; and a nut arranged between the plates.

7. In a joint, the combination of two opposing plates, one plate extending beyond the other of said plates, the ends of said longer plate forming a securing means for such plate; a securing means on the other of said plates; and a rubber insert between said plates bonded to the surfaces of said plates.

8. In a joint, the combination of two opposing plates, one plate extending beyond the other of said plates, the ends of said longer plate forming a securing means for such plate; a securing means on the other of said plates, said means being arranged between the plates; and a rubber insert between said plates bonded to the surfaces of said plates.

9. In a joint, the combination of two opposing plates, one plate extending beyond the other of said plates, the ends of said longer plate forming a securing means for such plate; a securing means on the other of said plates, said means being arranged between the plates in lapping non-contacting relation to the longer plate; and a rubber insert between said plates bonded to the surfaces of said plates.

10. In a joint, the combination of two overlapping joint plates; a rubber insert between the plates bonded to the opposing plates; and means between the plates limiting the side movement of the plates relatively to each other.

11. In a joint, the combination of two overlapping joint plates; a rubber insert between the plates bonded to the opposing plates; and securing means for one of said plates arranged between the plates, said means limiting the relative side movement of said plates.

12. In a joint, the combination of two opposing joint members; a rubber insert between the members bonded to the opposing surfaces of the members; and securing means for one of the members extending at an angle to the bonded surface thereof, said means having an extension out of contact with the opposing member adapted to positively lock the opposing member from disengagement.

13. In a joint, the combination of two opposing joint members; a rubber insert between the members bonded to the opposing surfaces of the members; and a bolt extending at an angle to and engaging one of the members and positively locking the other member against disengagement.

14. In a joint, the combination of two opposing joint members; a rubber insert between the members bonded to the opposing surfaces of the members; and a bolt extending at an angle to and engaging one of the members and positively locking the other member against disengagement, said bolt limiting the side movement of said members relatively to each other and positively locking said members against disengagement.

15. In a joint, the combination of two opposing joint members; a rubber insert between the members bonded to the opposing surfaces of the members; and a bolt extending at an angle to and engaging one of the members and extending through and out of contact with the other of said members and positively locking said members against disengagement.

16. In a joint, the combination of opposing members, one of said members being longer than the other, the extending ends of said member forming a securing means for said member; a rubber insert bonded to the opposing members; a nut secured to the shorter member and arranged between the members; and a bolt extending through the nut and through the longer member and positively locking the members against disengagement.

17. In a joint, the combination of two opposing plates; a rubber insert between the plates; securing means on the plates; a pin secured to one plate extending through and out of contact and normal holding relation with the other plate; and means on the pin positively locking the plates against separation.

18. In a joint, the combination of opposing joint plates; a rubber insert between the plates bonded to the opposing plates; and a nut forming a securing means arranged between the plates and between the rubber.

19. In a joint, the combination of two opposing joint members; a rubber insert between the members bonded to opposing surfaces of the members; and a means normally out of contact with one of the members positively locking the members against disengagement, said means extending at an angle to the bonded surface of one of the members.

20. In a joint, the combination of two opposing plates; a rubber insert between said plates bonded to the surfaces of said plates;

and securing means for said plates, the securing means of one of said plates comprising an extension of said plate outside of the rubber area and the securing means of the other of said plates being within the rubber area of the plate and comprising means extending at an angle thereto.

21. In a joint, the combination of two opposing plates; a rubber insert between said plates bonded to the surfaces of said plates; and securing means for said plates, the securing means of one of said plates comprising extensions of said plate outside of the rubber area and the securing means of the other of said plates being within the rubber area of the plate and comprising means extending at an angle thereto.

22. In a joint the combination of two opposing plates; a rubber insert between said plates bonded to the surfaces of said plates; and securing means for said plates, the securing means for one of said plates being within the rubber area of the plate and extending at an angle to the plate.

In testimony whereof I have hereunto set my hand.

HUGH C. LORD.